United States Patent

[11] 3,609,673

[72] Inventor Dietrich Muller
Achim, Germany
[21] Appl. No. 842,112
[22] Filed July 16, 1969
[45] Patented Sept. 28, 1971
[73] Assignee Fried. Krupp Gesellschaft mit beschrankter Haftung Essen, Germany

[54] SONAR SCANNING METHOD
2 Claims, 2 Drawing Figs.
[52] U.S. Cl. ........................................... 340/3 R,
340/3 A, 340/5 R, 340/6 R
[51] Int. Cl. ........................................... G01s 9/66
[50] Field of Search ........................................... 340/3, 3 A, 5, 6, 16, 100.6

[56] References Cited
UNITED STATES PATENTS
2,925,581 2/1960 Hackley et al. ............... 340/6

*Primary Examiner*—Richard A. Farley
*Attorney*—Wolf, Greenfield & Sacks

ABSTRACT: The invention concerns a sonar installation the transmitting device of which is switchable for the transmission of sounding pulses successively in different directions, within a circular sector of angular extent $n$ according to the direction sequence $(n/2)$, $(n/2)+1$, $(n/2)-1$, $(n/2)+2$ ...where $(n/2)$ is the approximate center of the circular sector, the + and − signs denote directions on either side of the $(n/2)$ direction, and the integers 1, 2, etc. represent units of angular displacement.

PATENTED SEP 28 1971 3,609,673
PRIOR ART Fig. 1
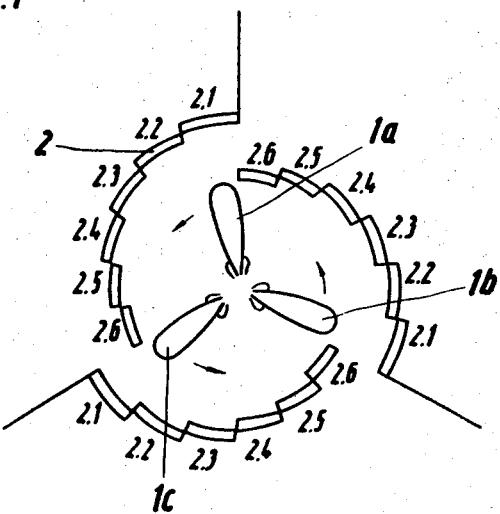
Fig. 2
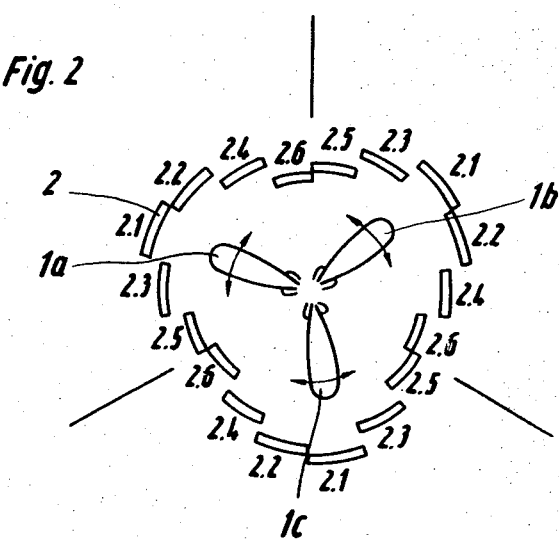
Inventor:
Dietrich Müller
Wolf, Greenfield Hicken & Sacks.

SONAR SCANNING METHOD

The invention relates to a sonar installation, the transmitting device of which can be switched for the transmission of directional sounding pulses in different directions with mutually adjoining or overlapping directional characteristics.

In sonar installations of the said kind, there is a known procedure for achieving a high transmission level, by creating a single relatively narrow directional beam with a high degree of compactness, and then swinging this over the desired observation region, in steps or continuously. This procedure is known in the literature as RDT (Rotation Direction Transmission).

In a known application of the principle, three directional transmission beams mutually displaced by 120° are produced, by means of which the entire region of 360° can be sounded by rotation of the three beams each through an angle of only 120°. The advantage of the RDT principle, that is to say the high transmission level and the consequently possible increase of the sounding range of the sonar installation, is detracted from by the large time duration which the transmission procedure needs, and by the time differences between radiation of the sound in the individual directions. Since the distance measurement with sonar installations is based on measurement of the sound travel time, compensating devices are necessary for compensating the above-mentioned time differences.

Since with almost all sonar installations which use the RDT principle, the known PPI (plan position indicator) display is used for displaying the signals from the sector being sounded, a distorted imaging is caused if no compensation devices are provided, since echos from different directions but from objects at the same sounding distance are indicated not on a circular arc but on a spiral arc.

The spiral distortion is particularly disturbing in sonar installations using transmission beams displaced by 120°, for objects which lie at such an angle relative to the transmitter that they are encountered by two transmission beams, once at the beginning of the transmitting procedure by one transmission beam and then at the end of the transmitting procedure by the transmitting beam displaced through 120° relative to the said one beam. In unfavorable cases this leads to one object producing two separated spots on the screen of the indicating tube.

Compensation measures, which remove or reduce the above mentioned disadvantages, are difficult to realize, because the distance error always continuously increases and then jumps back from its end value to its starting value.

The said disadvantages are overcome according to the invention by a transmitting device which is successively switchable to the directions $(n/2)$, $(n/2)+1$, $(n/2)-1$, $(n/2)+2$ and so on, more particularly by a transmitting assembly having $m$ individual transmitting devices and which thus embraces $m \cdot n$ different directions. The distance error, considered over the circumference, then has in its fine structure a stepwise path and in its coarse structure has only a continuous fluctuation between two limiting values. Also in this case it can occur that an object is encountered by two neighboring transmission beams which are relatively displaced in time, but the displacement is however, so slight that it no longer causes appreciable disturbances, and the PPI image is unambiguous.

In order to make the invention clearly understood, reference will now be made to the accompanying drawings which are given by way of example and in which:

FIG. 1 illustrates the time sequence of transmission of sounding pulses according to the conventional method; and FIG. 2 illustrates the time sequence of transmission of sounding pulses according to the invention.

A sonar installation with three transmission beams ($1a$, $1b$, $1c$) which are mutually displaced by 120° and which can be rotated, transmits time sequential sounding pulses 2, which are propagated in the radial direction with the speed of sound in the water. FIG. 1 shows the condition in the water for a given instant in which in the direction 2.1 a sounding pulse has been transmitted which has travelled the furthest. In the direction 2.6, of the most recently transmitted sounding pulse, this has not yet travelled far from the sonar installation. The numbering of the individual sounding pulses corresponds to the sequence of their transmission. The described relationships are true for each of the other directional beams, shown displaced by 120° and 240°.

Whereas FIG. 1 shows the conventional case with rotation of the directional transmission beams in one direction of rotation, FIG. 2 shows the case according to the invention for alternate rotation in opposite directions. Assuming that the transmitting device is switchable for the transmission of sounding pulses in different directions within a circular sector of angular extent $n$, the rotation should be such that the successive directions are $(n/2)$, $(n/2)+1$, $(n/2)-1$, $(n/2)+2$ and so on. The term $(n/2)$ represents the direction extending through the approximate center of the sector, the + and − signs denote directions on opposite side of the $(n/2)$ direction, and the integers 1, 2 etc. represent units of angular displacement. For example the integer 1 may represent a unit displacement of 15°. The path of the distance error which is now obtained by the distance difference between the sounding pulses of two neighboring directional beams, is essentially more uniform than with the FIG. 1 arrangement.

The transmitting device may be an assembly having $m$ individual transmitting devices (three for the embodiment of FIG. 2) so as to embrace $m \cdot n$ different directions.

The invention is not limited to the illustrated example, It is applicable to all sonar installations working according to the RDT principle.

We claim:

1. A method of operating a sonar transmitter to scan a sector of $n$ degrees, the transmitter being of the type which emits a directional sounding pulse that covers a small segment of the sector, the method comprising the steps of transmitting the sequence of sounding pulses to cover the entire sector, the first sounding pulse in the sequence being directed along the direction $(n/2)$ to cover a segment substantial at the center of the sector, and transmitting the subsequent pulses in the sequence along directions which are alternately on opposite sides of the direction of transmission of the first pulse, the subsequent pulses on the same side of the direction of transmission of the first pulse forming an echelon of pulses.

2. The method according to claim 1 of operating a sonar transmitter, the method further comprising the step of concurrently employing a plurality of transmitters of the type emitting directional sounding pulses to simultaneous scan a plurality of sectors.